US012025932B2

(12) United States Patent
Ikeno

(10) Patent No.: US 12,025,932 B2
(45) Date of Patent: Jul. 2, 2024

(54) HEATING UNIT

(71) Applicant: BROTHER KOGYO KABUSHIKI KAISHA, Nagoya (JP)

(72) Inventor: Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/935,200

(22) Filed: Sep. 26, 2022

(65) Prior Publication Data

US 2023/0099866 A1 Mar. 30, 2023

(30) Foreign Application Priority Data

Sep. 27, 2021 (JP) ................................ 2021-156370
Mar. 31, 2022 (JP) ................................ 2022-059582

(51) Int. Cl.
*G03G 15/20* (2006.01)
*G03G 15/00* (2006.01)

(52) U.S. Cl.
CPC ......... *G03G 15/2053* (2013.01); *G03G 15/80* (2013.01)

(58) Field of Classification Search
USPC .......................................................... 399/330
See application file for complete search history.

(56) References Cited

U.S. PATENT DOCUMENTS

2013/0336672 A1* 12/2013 Mizuta ............... G03G 15/2053 439/700
2014/0105634 A1 4/2014 Tanaka et al.
2018/0253054 A1 9/2018 Tanto

FOREIGN PATENT DOCUMENTS

JP 2004-214056 A 7/2004
JP 2014-81524 A 5/2014
JP 2018-146956 A 9/2018

* cited by examiner

*Primary Examiner* — Quana Grainger
(74) *Attorney, Agent, or Firm* — Merchant & Gould P.C.

(57) ABSTRACT

A holder holds a heater. A connector includes a connection terminal. The connector is configured to be attached to the holder by sandwiching a part of the holder and a part of the heater. The connection terminal is configured to be connected to a power supply terminal in a state where the connector is attached to the holder. The connector includes a body part and a claw. The body part sandwiches the part of the holder and the part of the heater in a state where the connector is attached to the holder. The claw protrudes in a direction away from the body part. The holder includes an engagement part. The engagement part is configured to engage with the claw from an upstream side in an attaching direction. The attaching direction is a direction in which the connector is attached to the holder.

20 Claims, 10 Drawing Sheets

HEATING UNIT

REFERENCE TO RELATED APPLICATIONS

This application claims priority from Japanese Patent Application No. 2021-156370 filed on Sep. 27, 2021 and Japanese Patent Application No. 2022-059582 filed on Mar. 31, 2022. The entire content of each of the priority applications is incorporated herein by reference.

BACKGROUND ART

Conventionally, a heating unit is used in a fixing device of an image forming apparatus, and so on.

DESCRIPTION

A heating unit includes a ceramic heater, an endless belt, a holder for supporting the ceramic heater, and a connector for supplying power to the ceramic heater. The heating unit further includes a fixing flange that rotatably supports an end of the belt. On the back surface of the connector, a lock member for preventing the connector from coming off is arranged. The lock member is a hook arm whose one end is fixed to the upper surface of the connector and elastically moves up and down. When mounted, the connector sandwiches the ceramic heater and the holder, and a claw portion provided at the lock member engages with a fitting portion provided at the fixing flange.

In the above-mentioned configuration, the fitting portion engaged by the claw portion of the connector is provided at the fixing flange which is a member different from the holder. Therefore, for example, if the positional accuracy between the holder and the fixing flange is low, the connector may move significantly with respect to the holder. If the connector moves significantly with respect to the holder, the position accuracy of the connector with respect to the heater held by the holder deteriorates, and thus the contact position and contact pressure between a heater terminal and a connector terminal may change significantly, for example.

In view of the foregoing, an example of an object of this disclosure is to provide a heating unit configured to improve the positioning accuracy of a connector with respect to a heater.

According to one aspect, this specification discloses a heating unit. The heating unit includes a heater, an endless belt, a holder, and a connector. The heater includes a base board, a resistance heating element, and a power supply terminal. The resistance heating element is provided on the base board. The power supply terminal is electrically connected to the resistance heating element. The endless belt is configured to rotate around the heater. The holder holds the heater. The connector includes a connection terminal. The connection terminal is configured to be connected to the power supply terminal in a state where the connector is attached to the holder. The connector includes a body part and a claw. The body part sandwiches the part of the holder and the part of the heater in a state where the connector is attached to the holder. The claw protrudes in a direction away from the body part. The holder includes an engagement part. The engagement part is configured to engage with the claw from an upstream side in an attaching direction. The attaching direction is a direction in which the connector is attached to the holder. According to this configuration, the holder to which the connector is attached has the engagement part configured to restrict the movement of the connector to the upstream side in the attaching direction. The configuration provides higher accuracy in positioning the connector with respect to the holder, and consequently provides higher accuracy in positioning the connector with respect to the heater supported by the holder.

According to another aspect, this specification discloses a heating unit. The heating unit includes a heater, an endless belt, a holder, and a connector. The heater includes a base board, a resistance heating element, and a power supply terminal. The resistance heating element is provided on the base board. The power supply terminal is electrically connected to the resistance heating element. The endless belt is configured to rotate around the heater. The holder holds the heater. The connector includes a connection terminal. The connector is configured to be attached to the holder by sandwiching a part of the holder and a part of the heater. The connection terminal is configured to be connected to the power supply terminal in a state where the connector is attached to the holder. The connector includes a body part sandwiching the part of the holder and the part of the heater in a state where the connector is attached to the holder. The holder includes a restricting surface located upstream of the power supply terminal in an attaching direction in which the connector is attached to the holder. The restricting surface faces the body part in a perpendicular direction perpendicular to both the attaching direction and a width direction of the connector. The restricting surface is configured to contact the body part. According to this configuration, since the holder to which the connector is attached has the restricting surface configured to restrict the movement of the connector, the configuration provides higher accuracy in positioning the connector with respect to the holder. This provides higher accuracy in positioning the connector with respect to the heater supported by the holder.

A heating unit according to a first embodiment will be detailed with reference to the drawings as appropriate.

Figure 1:
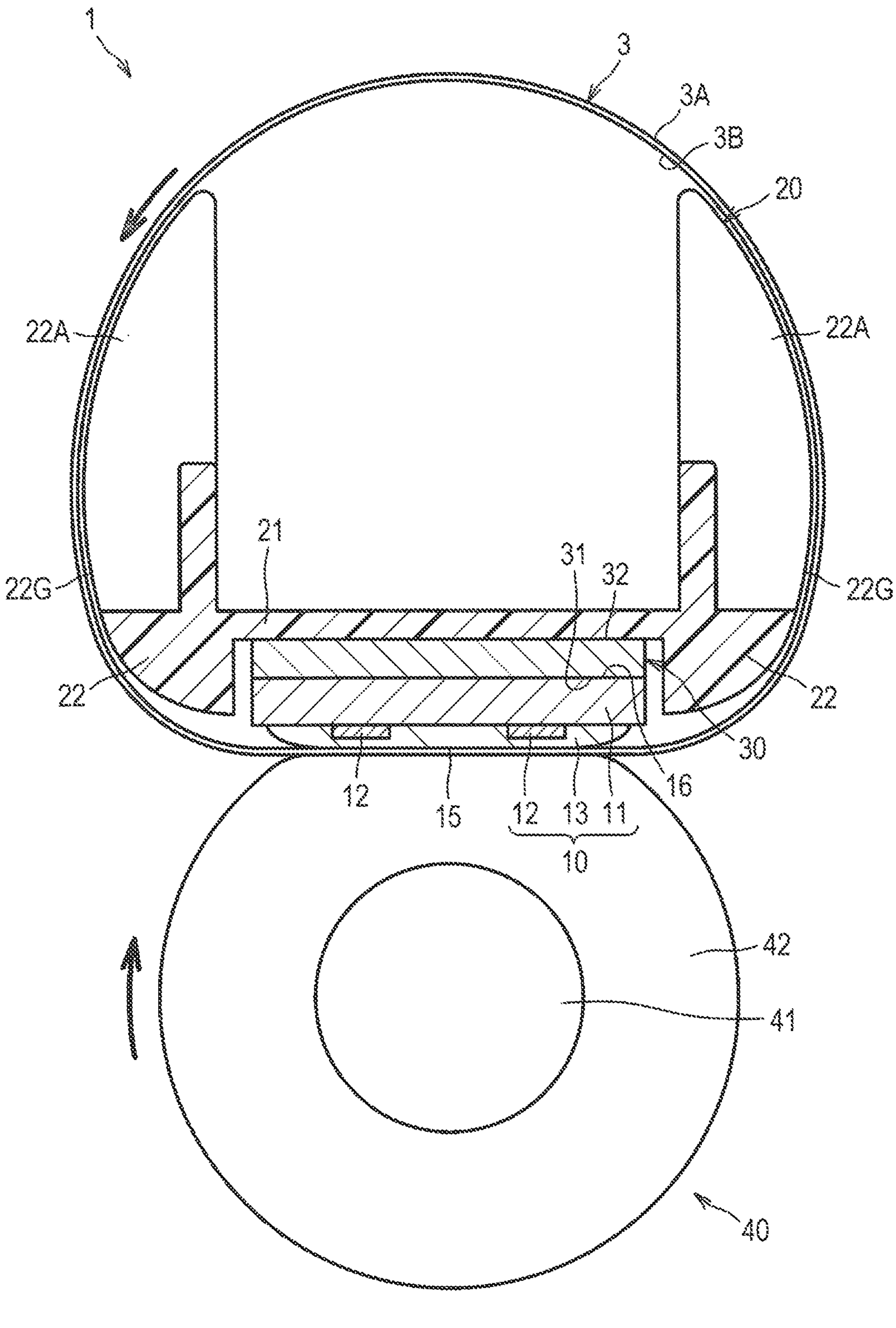
FIG. 1 is a cross-sectional view of a heating unit.

A heating unit 1 in the embodiment as shown in FIG. 1 is used in a fixing device of an image forming apparatus, an apparatus configured to transfer foil by heat, and so on. The heating unit 1 includes a belt 3, a heater 10, a holder 20, a heat conductive member 30, and a pressure roller 40.

The belt 3 is sandwiched between the pressure roller 40 and the heater 10. The pressure roller 40 has a columnar shaft 41 and a cylindrical roller part 42. The shaft 41 is made of, for example, metal. The roller part 42 is made of, for example, rubber. The roller part 42 covers a part of the shaft 41. The roller part 42 is in contact with the belt 3. One of the holder 20 and the pressure roller 40 is urged toward the other.

The belt 3 is an endless belt made of metal, resin and so on. The belt 3 rotates around the heater 10 while being guided by the holder 20. The belt 3 has an outer peripheral surface 3A and an inner peripheral surface 3B. The outer peripheral surface 3A is in contact with the pressure roller 40 or a sheet to be heated. The inner peripheral surface 3B is in contact with the heater 10.

Figures 2A, 2B, 2C:
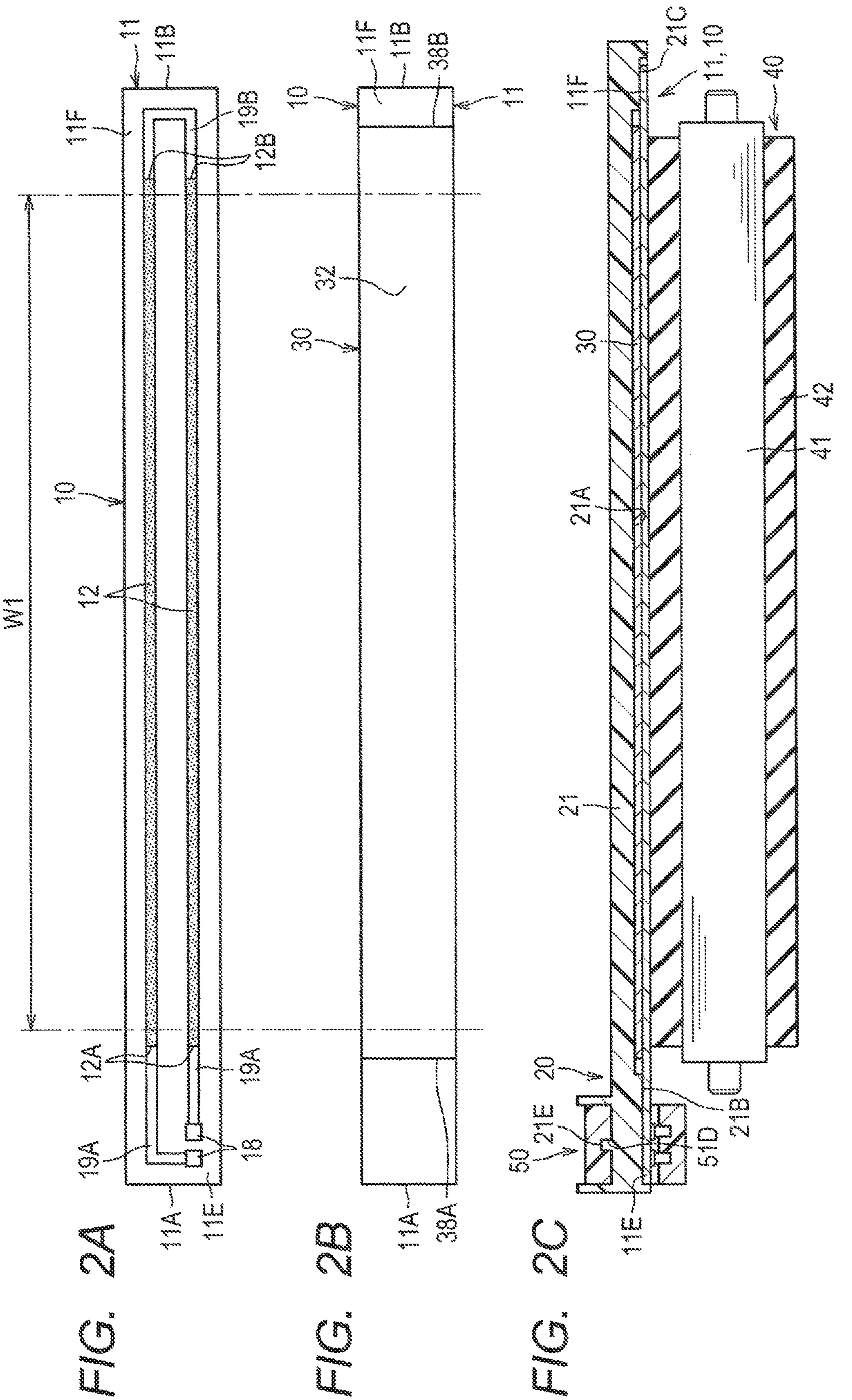
FIG. 2A is a view showing a surface on which a resistance heating element of a heater is arranged.
FIG. 2B is a view of the heater and a heat conductive member viewed from a back side of the heater.
FIG. 2C is a cross-sectional view of the heating unit cut in a longitudinal direction thereof.

The heater 10 has a base board 11, a resistance heating element 12 supported by the base board 11, and a cover 13. The base board 11 is formed of an elongated rectangular ceramic plate. The heater 10 is a so-called ceramic heater. The resistance heating element 12 is formed by printing on one surface of the base board 11. As shown in FIG. 2A, two pieces of the resistance heating elements 12 are disposed in the present embodiment. The two pieces of resistance heating elements 12 are each arranged long in a longitudinal direction of the heater 10 (hereinafter, the longitudinal direction of the heater 10 is simply referred to as "longitudinal direction") so as to be in parallel while being apart from each other in a short direction perpendicular to the longitudinal direction. The resistance heating elements 12 have one ends 12A connected to conducting wires 19A, respectively. Power supply terminals 18 for supplying power are disposed at the ends of the conducting wires 19A, respectively.

The power supply terminals 18 are electrically connected to the resistance heating elements 12 via the conducting wires 19A, respectively. The power supply terminals 18 are located at a one end part 11E in the longitudinal direction of the base board 11.

The resistance heating elements 12 have other ends 12B which are connected to each other via a conducting wire 19B. The number of the resistance heating elements 12 is not specifically limited. The heater 10 may be configured with a resistance heating element in which the center part thereof in the longitudinal direction has a larger heating amount than the end parts thereof in the longitudinal direction, and a resistance heating element in which the end parts thereof in the longitudinal direction have a larger heating amount than the center part thereof in the longitudinal direction, so that the resistance heating elements are individually controlled to adjust the distribution of heat generation in the longitudinal direction.

As shown in FIG. 1, the cover 13 covers the resistance heating elements 12. The cover 13 is made of, for example, glass. The heater 10 has a nip surface 15 which is in contact with the inner peripheral surface 3B of the belt 3, and a back surface 16 which is the opposite surface to the nip surface 15.

The holder 20 is the member to support the heater 10. The holder 20 has a support part 21 and guide parts 22. The support part 21 has a plate shape adapted to the shape of the heater 10. The guide parts 22 are disposed at both ends in the short direction of the support part 21, respectively. The guide parts 22 have guide surfaces 22G formed along the inner peripheral surface 3B of the belt 3, respectively. Each of the guide parts 22 has a plurality of guide ribs 22A arranged in the longitudinal direction.

The heat conductive member 30 conducts heat of the heater 10 in the longitudinal direction, so as to uniformize the temperature of the heater 10 in the longitudinal direction. The heat conductive member 30 is a sheet like member, and is located between the back surface 16 of the heater 10 and the support part 21 of the holder 20. In the heating unit 1, when a sheet to be heated is sandwiched between the belt 3 and the pressure roller 40, the heat conductive member 30 is sandwiched between the heater 10 and the support part 21. The heat conductive member 30 has a heater-side surface 31 which is in contact with the back surface 16 of the heater 10, and an opposite surface 32 which is the opposite surface to the heater-side surface 31. The opposite surface 32 is in contact with the support part 21.

The heat conductive member 30 has higher thermal conductivity than the thermal conductivity of the base board 11 in a plane direction parallel to the heater-side surface 31. The material of the heat conductive member 30 is not specifically limited. The heat conductive member 30 may be made of metal having high thermal conductivity, for example, aluminum, aluminum alloy, or copper.

As shown in FIG. 2A and FIG. 2B, the one ends 12A and the other ends 12B of the resistance heating elements 12 are located, in the longitudinal direction, outside a maximum width W1 of a usable sheet in the heating unit 1 and inside one end 38A and an other end 38B of the heat conductive member 30. In other words, the heat conductive member 30 is longer than the resistance heating elements 12 in the longitudinal direction.

The one end 38A and the other end 38B of the heat conductive member 30 are located, in the longitudinal direction, outside the one ends 12A and the other ends 12B of the resistance heating elements 12 and inside one end 11A and an other end 11B of the base board 11. In other words, the base board 11 is longer than the heat conductive member 30 in the longitudinal direction. The power supply terminals 18 described above are arranged away from the one end 38A of the heat conductive member 30 in the longitudinal direction.

As shown in FIG. 2C, the support part 21 of the holder 20 has a first surface 21A, a second surface 21B, and a third surface 21C, which are surfaces on the side of the heater 10. The first surface 21A supports the heat conductive member 30 by being in contact with the heat conductive member 30. The second surface 21B supports the one end part 11E of the base board 11 by being in contact with the one end part 11E of the base board 11. The third surface 21C supports an other end part 11F of the base board 11 by being in contact with the other end part 11F of the base board 11. The illustration in FIG. 2C has none of the resistance heating element 12, the cover 13, and the belt 3, for simplicity.

The heating unit 1 further includes a connector 50 for supplying electricity to the heater 10. The connector 50 is attached to the holder 20 so as to sandwich the one end part in the longitudinal direction which is one part of the holder 20 and the one end part in the longitudinal direction which is one part of the heater 10.

Figure 3A:
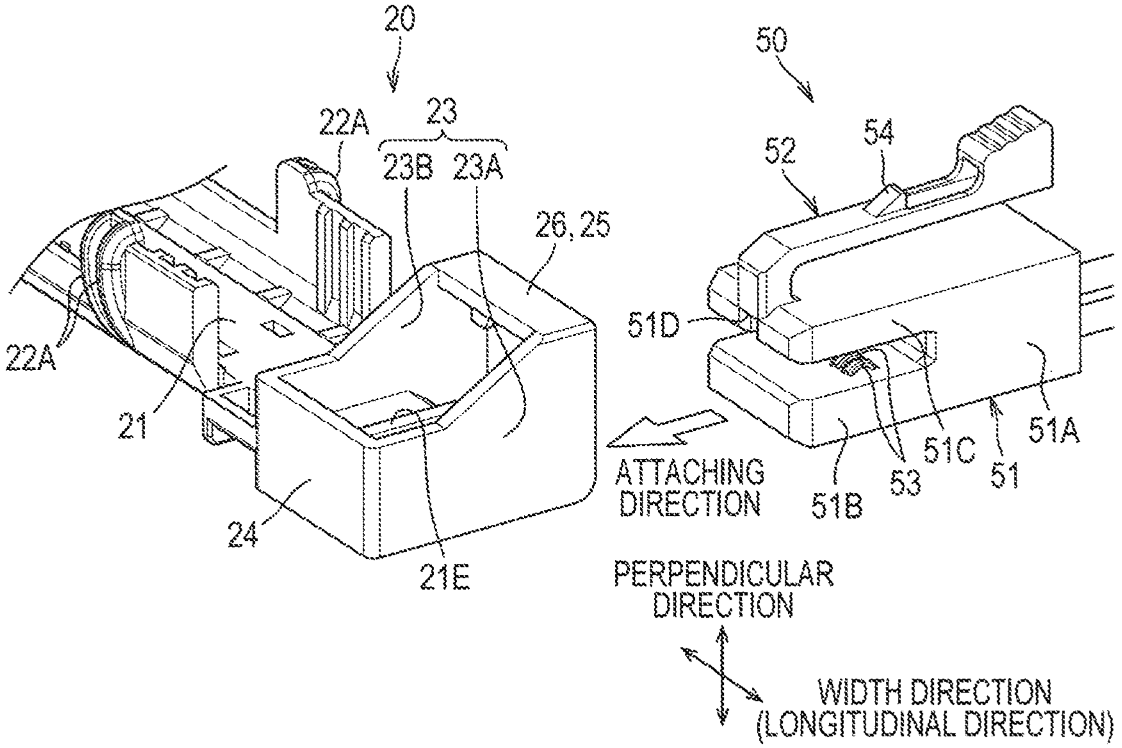
FIG. 3A is a perspective view showing one end of a holder in the longitudinal direction and a connector.

As shown in FIG. 3A, the connector 50 has a body part 51 and an arm 52 which are made of resin and so on, connection terminals 53 made of conductive material such as metal, and a claw 54.

Figure 4:
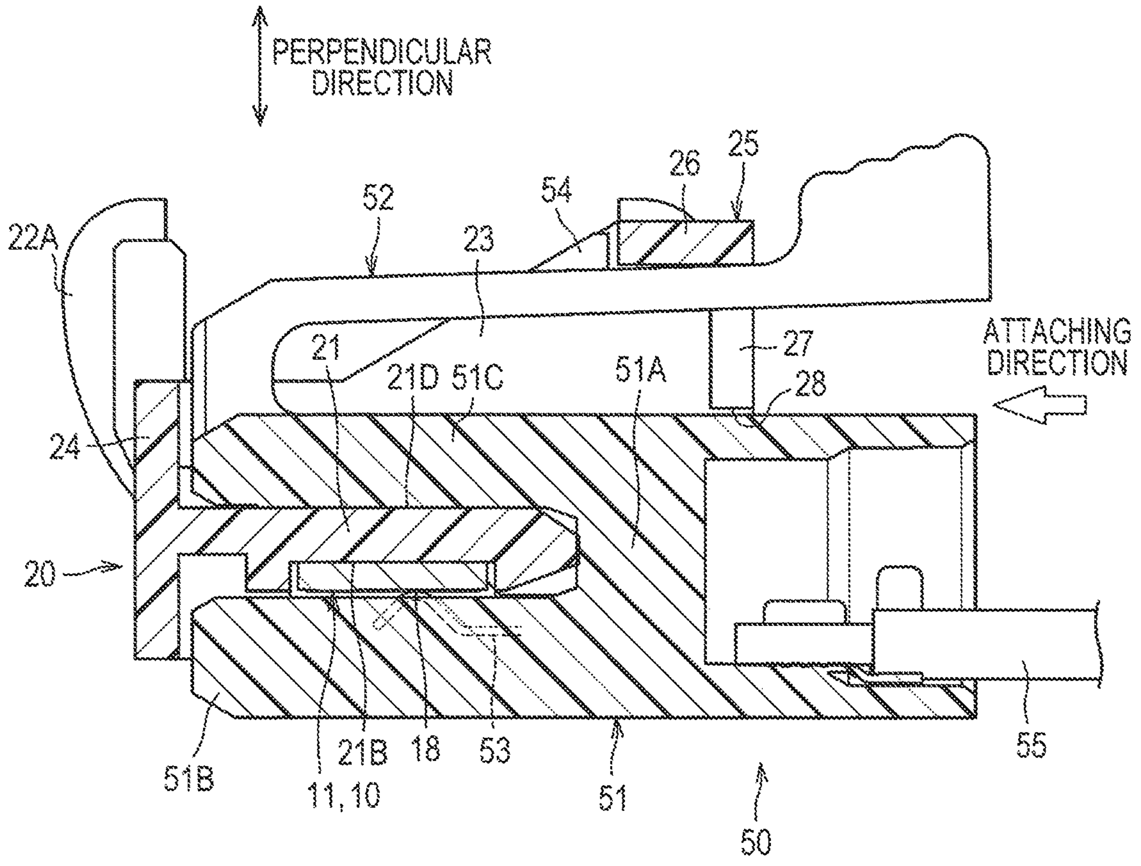
FIG. 4 is a cross-sectional view showing one end of the heater and the holder in the longitudinal direction and the connector.

The connection terminals 53 are formed of an elastic metal plate. The connection terminal 53 for the positive power supply terminal 18 of the heater 10 and the connection terminal 53 for the negative power supply terminal 18 of the heater 10 are arranged in parallel at an interval in the longitudinal direction of the heater 10. As shown in FIG. 4, the connection terminals 53 are connected to the power supply terminals 18 of the heater 10, respectively. Specifically, in a state where the connector 50 is attached to the holder 20, the connection terminals 53 are connected to the power supply terminals 18.

In a state where the connector 50 is attached to the holder 20, the body part 51 sandwiches the one end part of the holder 20 in the longitudinal direction and the one end part of the heater 10 in the longitudinal direction. The body part 51 has a base part 51A, and a first extension part 51B and a second extension part 51C which are formed to extend from the base part 51A toward the heater 10.

The first extension part 51B has the connection terminals 53. The first extension part 51B and the second extension part 51C are arranged at an interval in the perpendicular direction which is perpendicular to both of an attaching direction of the connector 50 and a width direction (refer to FIG. 3A) of the connector 50. The first extension part 51B (the connection terminals 53 specifically) and the second extension part 51C sandwich the one end part of the holder 20 in the longitudinal direction and the one end part of the heater 10 in the longitudinal direction, in the perpendicular direction.

The connector 50 is attached to the one end part of the holder 20 in the longitudinal direction from one side toward the other side (from the right side to the left side in FIG. 4) in the short direction of the heater 10. The attaching direction of the connector 50 is the direction from the one side toward the other side in the short direction of the heater 10. Hereinafter, the attaching direction of the connector 50 is also referred to simply as “attaching direction”. In the present embodiment, the width direction of the connector 50 in a state of being attached to the holder 20 is the same as the longitudinal direction of the heater 10.

As shown in FIG. 3A, the second extension part 51C has a groove 51D on the surface facing the first extension part 51B. The groove 51D is formed to be recessed in the perpendicular direction and to extend in the attaching direction. The groove 51D is arranged at the center part of the connector 50 in the width direction of the connector 50. In a state where the connector 50 is attached to the holder 20, the groove 51D allows the insertion of a protruding part 21E formed on the one end part of the holder 20 in the longitudinal direction (refer to FIG. 2C). As a result, in a state where the connector 50 is attached to the holder 20, the movement in the longitudinal direction of the connector 50 with respect to the holder 20 is restricted. The protruding part 21E is formed to protrude in the perpendicular direction and to extend in the attaching direction (refer to FIG. 5A).

As shown in FIG. 4, the arm 52 is located at one side of the body part 51 in the perpendicular direction, and is formed to extend in the attaching direction of the connector 50. The arm 52 is arranged at the center part of the connector 50 in the width direction of the connector 50 (refer to FIG. 3A). The arm 52 is formed to extend from the tip part of the second extension part 51C to the opposite side of the first extension part 51B, and to bend and extend to the upstream side in the attaching direction so as to be apart from the second extension part 51C. As a result, the arm 52 is formed such that one end thereof in the attaching direction is connected to the body part 51 and elastically bends such that the other end thereof moves toward the body part 51.

In a state where the connector 50 is attached to the holder 20, the arm 52 elastically bends and is in contact with a stopper (engagement part) 26 described later of the holder 20. In this state, in a state where the first extension part 51B and the second extension part 51C of the body part 51 sandwich the one end part of the holder 20 in the longitudinal direction and the one end part of the heater 10 in the longitudinal direction, the second extension part 51C is in contact with a fourth surface 21D which is the opposite surface to the second surface 21B of the holder 20. The second surface 21B supports a part of the heater 10 in the longitudinal direction.

The claw 54 is formed on the arm 52. Specifically, the claw 54 is formed to protrude from the vicinity of the center part in the attaching direction of the arm 52 to the direction separating from the body part 51. In the claw 54, the surface at the upstream side in the attaching direction is substantially perpendicular to the attaching direction, and the surface at the downstream side in the attaching direction is inclined so as to approach the arm 52 from the upstream side toward the downstream side in the attaching direction.

Figure 3B:
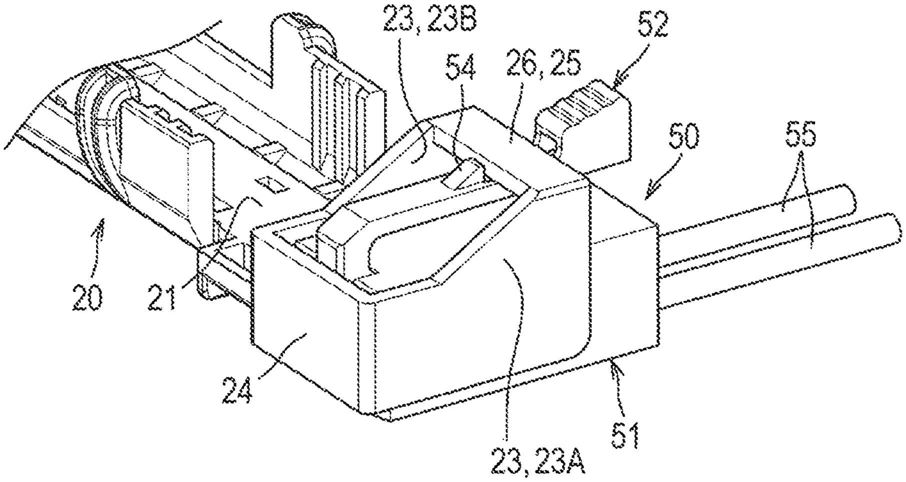
FIG. 3B is a perspective view showing a state where the connector is attached to the holder.

As shown in FIG. 3A and FIG. 3B, the holder 20 further has a pair of walls 23, a connection wall 24, and a bridging part 25. The pair of walls 23, the connection wall 24, and the bridging part 25 are integrally formed on the one end part of the holder 20 in the longitudinal direction.

The pair of walls 23 is provided so as to face each other in the direction perpendicular to the attaching direction of the connector 50, specifically in the longitudinal direction of the heater 10 in the present embodiment. The pair of walls 23 is arranged so as to sandwich the connector 50 in a state of being attached to the holder 20. In the longitudinal direction of the heater 10, the interval between the pair of walls 23 is slightly longer than the size in the width direction of the connector 50 (the width of the connector 50). As one example, the interval between the pair of walls 23 is longer than the width of the connector 50 by approximately several hundreds μm (micrometers). The pair of walls 23 is configured with a wall 23A located at the one side in the longitudinal direction serving as one wall of the pair of walls 23, and a wall 23B located at the other side in the longitudinal direction serving as the other wall of the pair of walls 23.

The connection wall 24 is formed to connect the ends of the pair of walls 23 (23A and 23B) at the downstream side in the attaching direction. The connection wall 24 is arranged substantially perpendicular to the attaching direction of the connector 50.

Figure 5A:
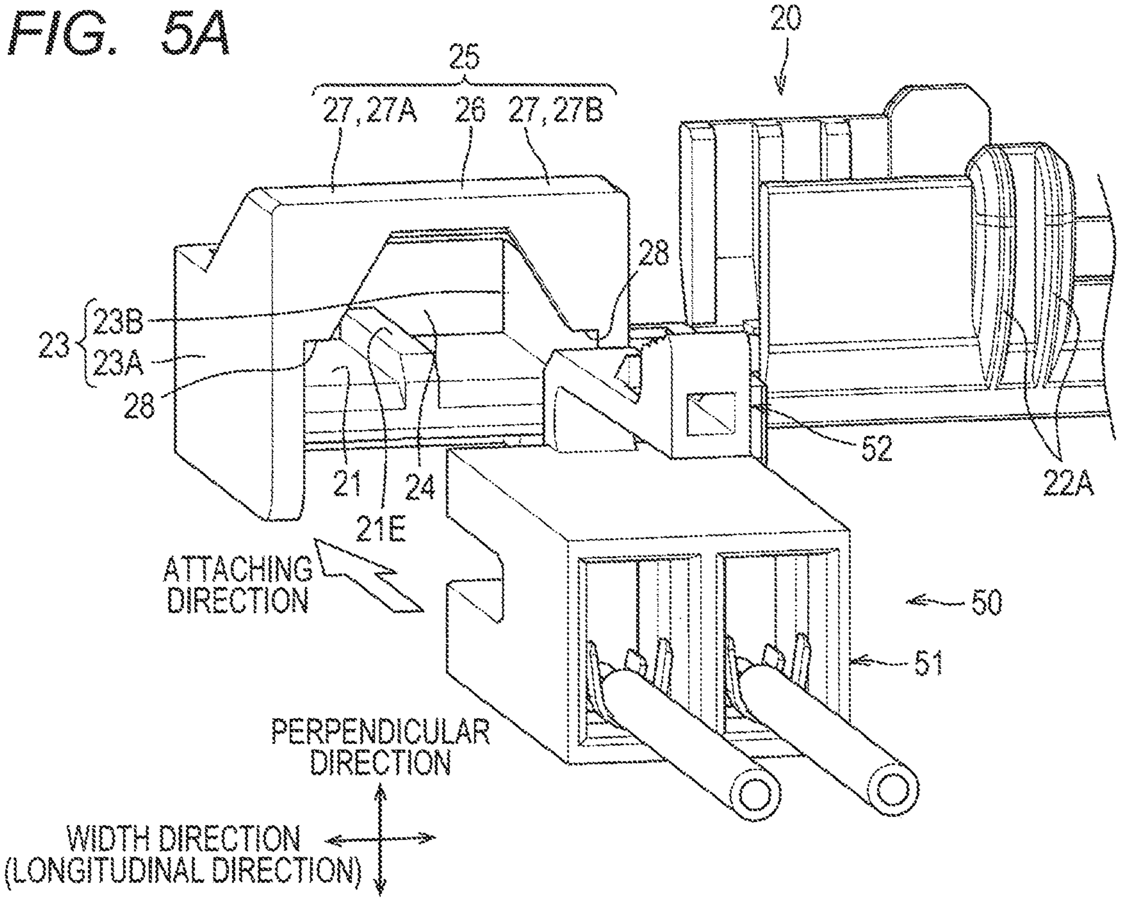
FIG. 5A is a perspective view showing one end of the holder in the longitudinal direction and the connector viewed from a bridge portion side.
Figure 5B:
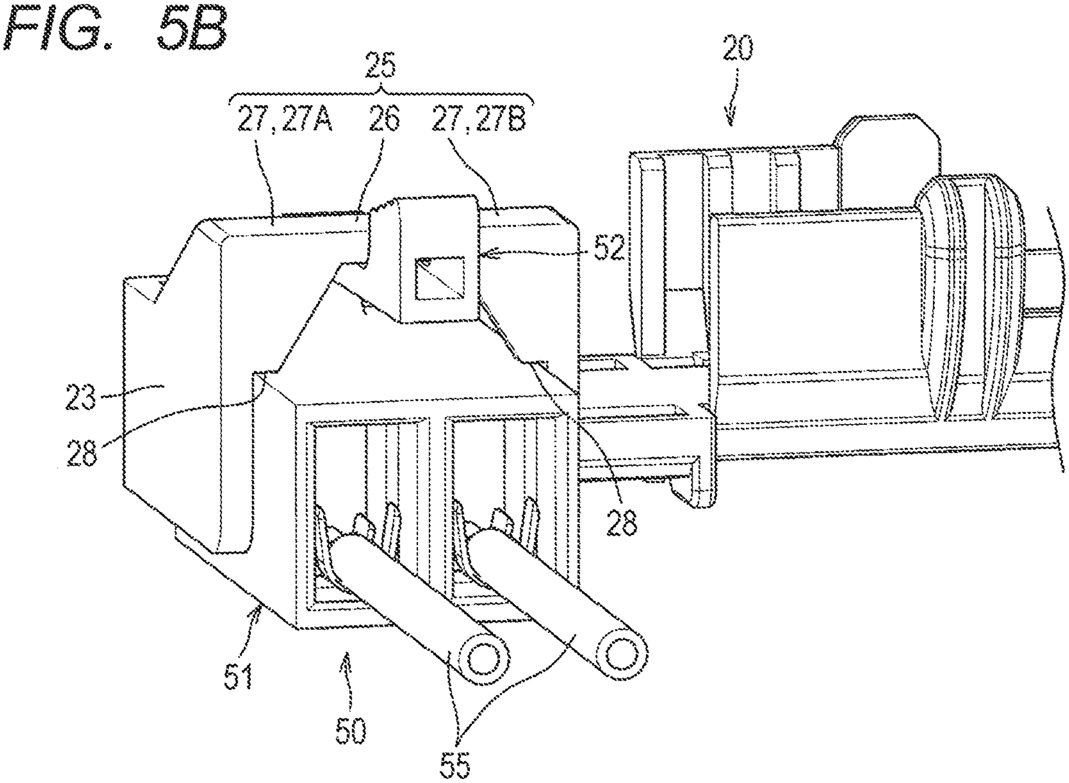
FIG. 5B is a perspective view showing a state where the connector is attached to the holder.

As shown in FIG. 5A and FIG. 5B, the bridging part 25 is arranged to connect ends of the pair of walls 23 at the upstream side in the attaching direction, the ends of the pair of walls 23 being at one side (the upper side in FIG. 5) in the perpendicular direction. The bridging part 25 has the stopper 26 and a pair of restricting parts 27.

As shown in FIG. 3B and FIG. 4, the stopper 26 is configured to allow the engagement of the claw 54 of the connector 50 in a state of being attached to the holder 20. The stopper 26 engages with (contacts) the claw 54 from the upstream side in the attaching direction of the connector 50. In other words, the claw 54 engages with (contacts) the stopper 26 from the downstream side in the attaching direction of the connector 50. The stopper 26 which the claw 54 is engaged with restricts the movement of the connector 50 to the upstream side in the attaching direction of the connector 50. As shown in FIG. 4, the stopper 26 is arranged so that the stopper 26 and the body part 51 of the connector 50 sandwich the arm 52 in a state where the connector 50 is attached to the holder 20. As shown in FIG. 5A, in the stopper 26, the one end thereof in the longitudinal direction is connected to the wall 23A via one of the restricting parts 27 (27A), and the other end thereof is connected to the wall 23B via the other of the restricting parts 27 (27B).

The restricting parts 27 are configured with a restricting part 27A located between the stopper 26 and the wall 23A, and a restricting part 27B located between the stopper 26 and the wall 23B. In the restricting parts 27, the surfaces on one side in the perpendicular direction (the surfaces at the upper side in FIGS. 5A and 5B) are arranged to be substantially flush with the surface of the stopper 26 at the one side in the perpendicular direction.

The surfaces of the restricting parts 27 at the other side in the perpendicular direction (restricting surfaces 28 described later) are closer to the body part 51 of the connector 50 than the surface of the stopper 26 at the other side in the perpendicular direction is (refer to FIG. 5B). The surfaces of the restricting parts 27 at the other side in the perpendicular direction and the surface of the stopper 26 at the other side in the perpendicular direction are connected by the inclined surfaces which approach the body part 51 of the connector 50 toward the outsides in the longitudinal direction of the bridging part 25.

As shown in FIG. 4, the restricting parts 27 (only one of the restricting parts 27 is shown) are arranged further upstream of the power supply terminals 18 in the attaching direction of the connector 50. The restricting parts 27 have the restricting surfaces 28, respectively. Specifically, the restricting parts 27 have the restricting surfaces 28 at the other side in the perpendicular direction, respectively. The restricting surfaces 28 are configured to restrict the movement of the connector 50 in the perpendicular direction, specifically to the upper side in FIG. 4 in the present embodiment, by being in contact with the body part 51 of the connector 50 when a cable 55 connected to the connector 50 is drawn to the upper side in FIG. 4 or other case.

As shown in FIG. 5B, the restricting parts 27 are arranged at both sides of the stopper 26 in the longitudinal direction of the heater 10, and accordingly the restricting surfaces 28 formed in the restricting parts 27 are arranged at both sides of the stopper 26 in the longitudinal direction of the heater 10.

In the first embodiment described above, the holder 20 to which the connector 50 is attached has the stopper 26 configured to restrict the movement of the connector 50 to the upstream side in the attaching direction. The configuration provides higher accuracy in positioning the connector 50 with respect to the holder 20, and consequently provides higher accuracy in positioning the connector 50 with respect to the heater 10 supported by the holder 20. This stabilizes the contact position and the contact pressure between the power supply terminals 18 of the heater 10 and the connection terminals 53 of the connector 50.

In a state where the connector 50 is attached to the holder 20, the arm 52 of the connector 50 elastically bends and makes contact with the stopper 26 of the holder 20. The restoring force of the arm 52 thus pushes the body part 51 of the connector 50 against the fourth surface 21D of the holder 20 which is arranged at the opposite side to the heater 10. This reduces the positional displacement of the connector 50 with respect to the heater 10 occurring due to, for example, the vibration generated when the heating unit 1 operates, and consequently reduces the variation in contact position and contact pressure between the power supply terminals 18 and the connection terminals 53.

The body part 51 of the connector 50 is pushed against the fourth surface 21D of the holder 20 which is arranged at the opposite side to the heater 10, which suppresses the force being directly applied by the connector 50 to the heater 10. This reduces the application of a bending stress from the connector 50 to the base board 11 of the heater 10, and consequently reduces a breakage of the resistance heating elements 12 and so on, which may occur due to the bending of the base board 11.

Since the one end of the stopper 26 in the longitudinal direction is connected to the wall 23A serving as the one wall, and the other end is connected to the wall 23B serving as the other wall, the stopper 26 is supported by the pair of walls 23 (23A and 23B) from both sides. The configuration ensures the strength of the stopper 26, and thus more reliably restricts the movement of the connector 50 in the case where the claw 54 of the connector 50 is engaged with the stopper 26, and consequently provides higher accuracy in positioning the connector 50 with respect to the heater 10.

Since the holder 20 has the connection wall 24 connecting the pair of walls 23, the connection wall 24 reinforces the pair of walls 23. The configuration more reliably ensures the strength of the stopper 26 supported by the pair of walls 23, and thus still more reliably restricts the movement of the connector 50, and consequently provides further higher accuracy in positioning the connector 50 with respect to the heater 10.

Since the holder 20 to which the connector 50 is attached has the restricting surfaces 28 configured to restrict the movement of the connector 50, the configuration provides higher accuracy in positioning the connector 50 with respect to the holder 20. In one example, even in the case where the cables 55 connected to the connector 50 are drawn and the connector 50 is apt to swing around the vicinity of the part sandwiched by the connector 50 in the holder 20, the restricting surfaces 28 restrict the position of the connector 50 with respect to the holder 20 by being in contact with the body part 51. This provides higher accuracy in positioning the connector 50 with respect to the heater 10 supported by the holder 20.

Since the restricting surfaces 28 are arranged at both sides of the stopper 26, even in the case where the connector 50 is apt to swing as described above, the pair of restricting surfaces 28 arranged at both sides of the stopper 26 more reliably restrict the position of the connector 50. This provides further higher accuracy in positioning the connector 50 with respect to the heater 10.

Next, a second embodiment will be described. In the following description, the points different from those in the first embodiment will be described, and the same elements will be designated by the same reference numerals and the description thereof will be omitted as appropriate.

Figure 6A:
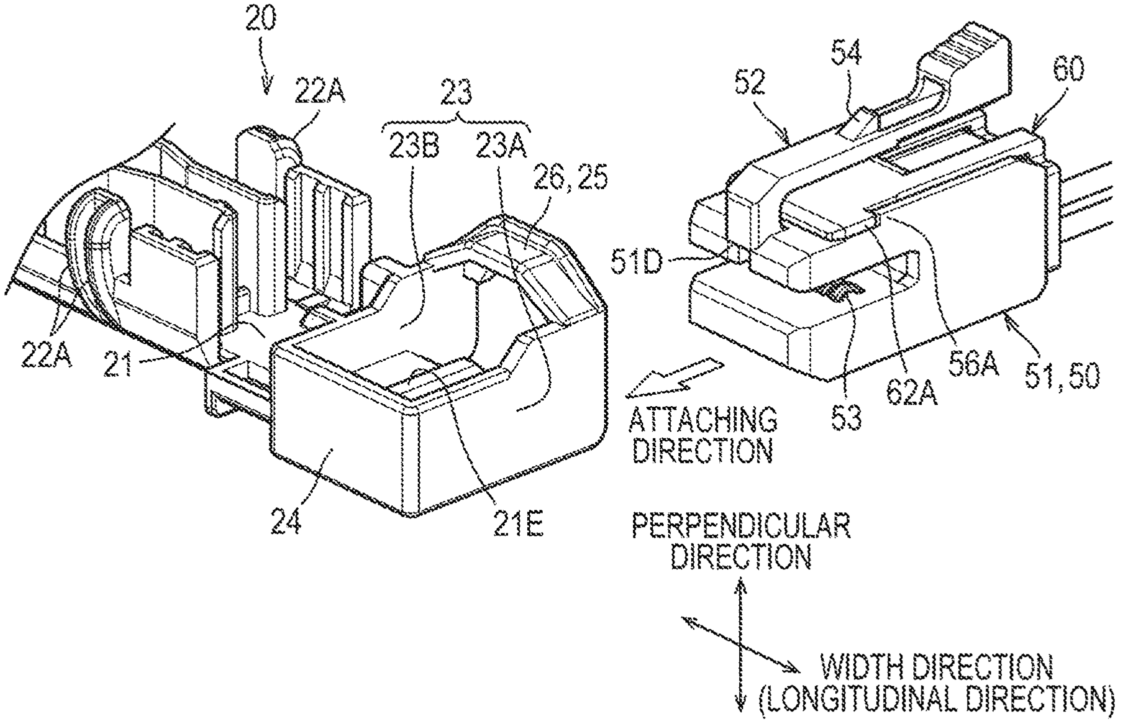
FIG. 6A is a perspective view showing one end of a holder in the longitudinal direction and a connector in a state where a connector cover is attached.
Figure 6B:
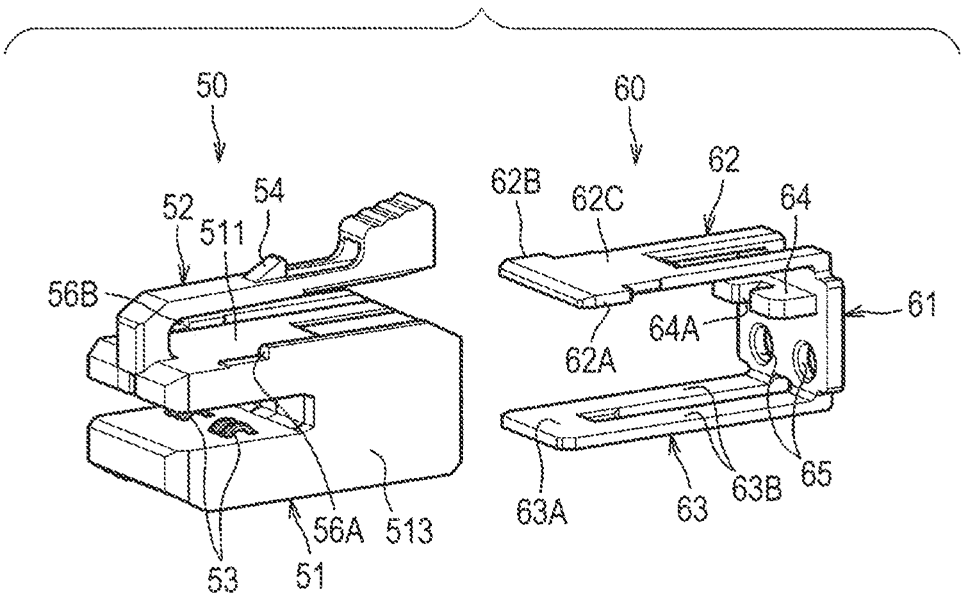
FIG. 6B is a perspective view of the connector and the connector cover.

As shown in FIG. 6A and FIG. 6B, the heating unit 1 in the second embodiment further includes a connector cover 60 to be attached to the connector 50.

Figure 7A:
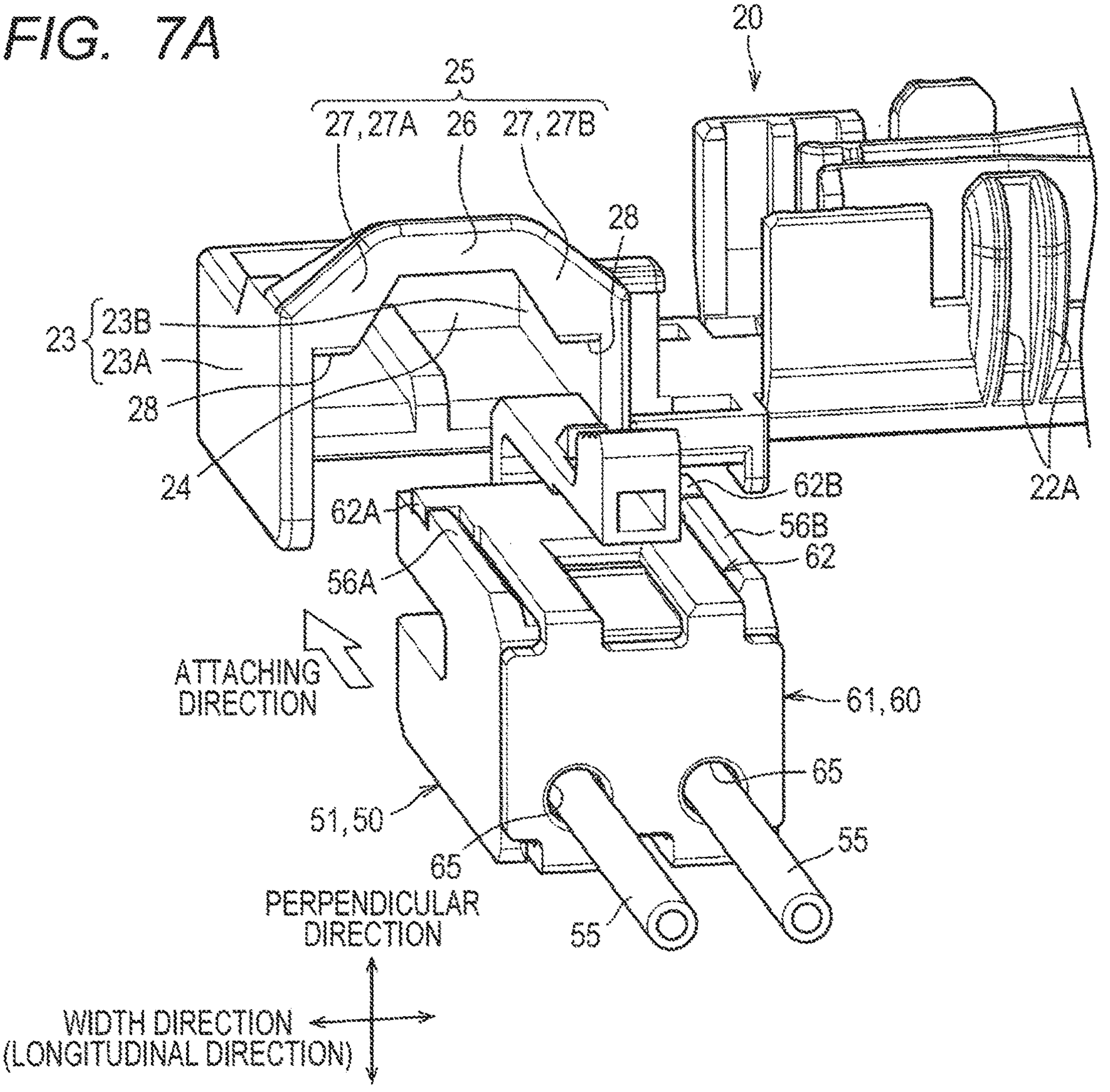
FIG. 7A is a perspective view showing one end of the holder in the longitudinal direction and the connector in a state where the connector cover is attached, as viewed from a cable side.
Figure 7B:
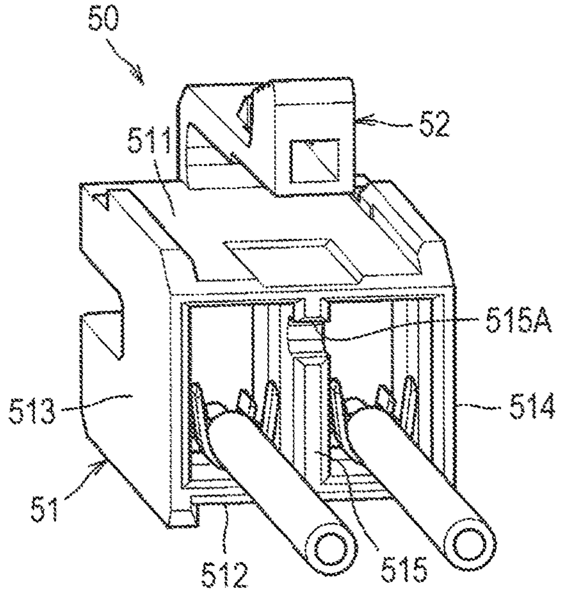
FIG. 7B is a perspective view showing the connector as viewed from the cable side.

As shown in FIG. 7B, the body part 51 of the connector 50 has a first body wall 511 and a second body wall 512 serving as the walls in the perpendicular direction, a third body wall 513 and a fourth body wall 514 serving as the walls in the width direction of the connector 50, and a fifth body wall 515. The perpendicular direction is perpendicular to both of the attaching direction of the connector 50 and the facing direction of the pair of walls 23 of the holder 20. In the present embodiment, the facing direction of the pair of walls 23 is the same as the width direction of the connector 50 in a state of being attached to the holder 20.

Figure 8:
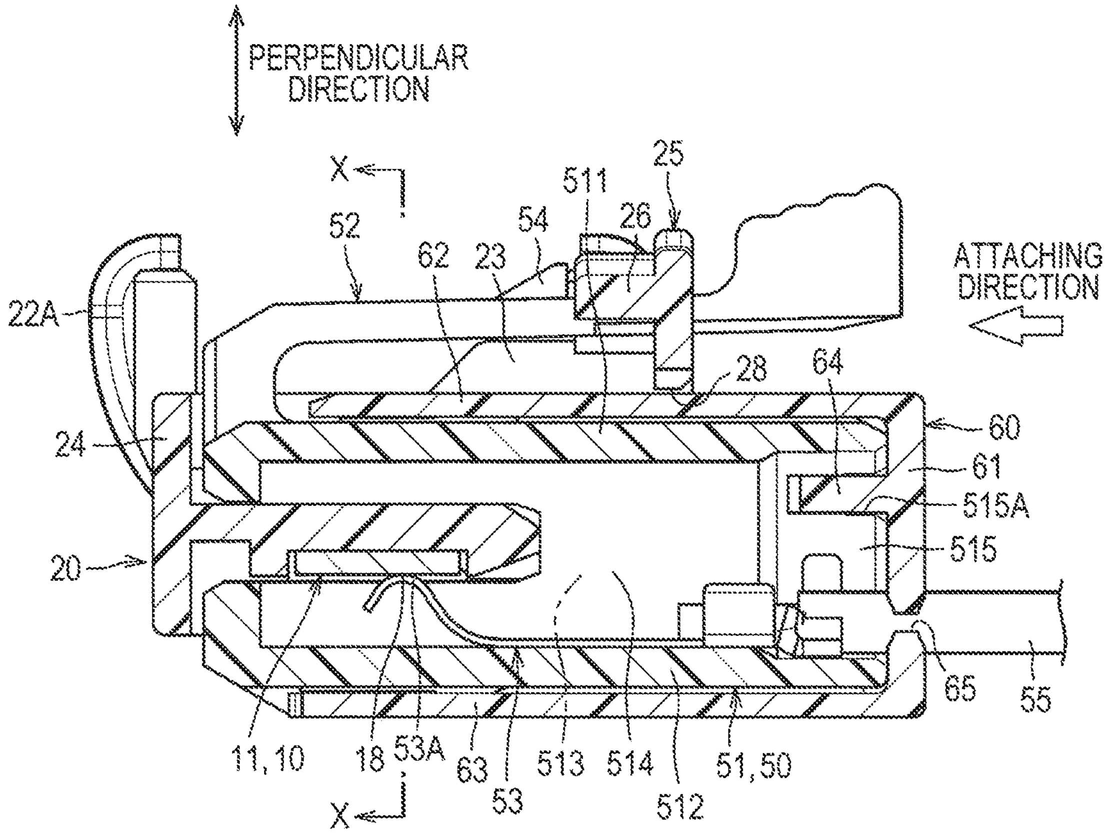
FIG. 8 is a cross-sectional view showing one end of the heater and the holder in the longitudinal direction and the connector in a state where the connector cover is attached.

As shown in FIG. 8, the first body wall 511 and the second body wall 512 face each other in the perpendicular direction. The first body wall 511 and the second body wall 512 cover the connection terminals 53, when viewed from the perpendicular direction. In the present embodiment, the arm 52 of the connector 50 is formed to extend from the end of the first body wall 511 at the downstream side in the attaching direction.

The third body wall 513 and the fourth body wall 514 face each other in the width direction of the connector 50, and are formed substantially symmetrically in the width direction of the connector 50. The third body wall 513 and the fourth body wall 514 are respectively formed substantially in the U-shapes opened toward the downstream side in the attaching direction, when viewed from the width direction of the connector 50. The third body wall 513 and the fourth body wall 514 cover a part of the connection terminals 53, specifically the part other than contact parts 53A of the connection terminals 53 which are connected to the power supply terminals 18. The contact parts 53A are exposed from the openings formed substantially in the U-shapes of the third body wall 513 and the fourth body wall 514, when the connector 50 before being attached to the holder 20 is viewed from the width direction.

As shown in FIG. 7B, the fifth body wall 515 is formed to extend in the perpendicular direction so as to connect the end part of the first body wall 511 at the upstream side in the attaching direction and the end part of the second body wall 512 at the upstream side in the attaching direction. The fifth body wall 515 is arranged between the third body wall 513 and the fourth body wall 514 in the width direction of the connector 50. Such arrangement of the fifth body wall 515 ensures the rigidity of the body part 51. The fifth body wall 515 has a recess 515A which is recessed from the upstream side to the downstream side in the attaching direction, at an end part close to the first body wall 511 in the perpendicular direction.

As shown in FIG. 6B, the connector cover 60 has a cover wall 61, a first wall 62, a second wall 63, and a positioning part 64.

As shown in FIG. 8, in a state where the connector cover 60 is attached to the connector 50, the cover wall 61 covers the upstream side of the connector 50 in the attaching direction. Specifically, the cover wall 61 covers, from the upstream side in the attaching direction, an opening formed by the first body wall 511, the second body wall 512, the third body wall 513, and the fourth body wall 514 (also refer to FIGS. 7A and 7B). In a state where the connector cover 60 is attached to the connector 50, the cover wall 61 thus covers the upstream side of the connection terminals 53 in the attaching direction.

As shown in FIG. 8 and FIG. 7A, the cover wall 61 has two through holes 65. The through holes 65 allow the insertion of the cables 55 to be connected to the connection terminals 53 of the connector 50. Each of the through holes 65 has a shape along the outer periphery of the cable 55. Specifically, each of the through holes 65 has a circular shape along the outer periphery of the substantially circular cable 55, when viewed from the attaching direction. In the present embodiment, the inner peripheral surfaces of the through holes 65 are in contact with the outer peripheries of the cables 55. Specifically, the inner peripheral surfaces of the through holes 65 are in contact with the outer peripheries of the cables 55 over the entire circumference of the cables 55.

As shown in FIG. 6B, the first wall 62 is formed to extend from one end of the cover wall 61 in the perpendicular direction to the downstream side in the attaching direction, and the second wall 63 is formed to extend from the other end of the cover wall 61 in the perpendicular direction to the downstream side in the attaching direction. When the connector cover 60 is attached to the connector 50, the first wall 62 and the second wall 63 sandwich the body part 51 of the connector 50.

The first wall 62 has a pair of first engagement parts 62A, 62B. When the first engagement parts 62A, 62B are engaged with the body part 51 of the connector 50, the movement of the connector cover 60 to the upstream side in the attaching direction is restricted. Specifically, the first wall 62 has an arm body 62C formed to extend from one end of the cover wall 61 in the perpendicular direction to the downstream side in the attaching direction. The first engagement part 62A is formed to protrude from the tip part of the arm body 62C to one side in the width direction of the connector 50. The first engagement part 62B is formed to protrude from the tip part of the arm body 62C to the other side in the width direction of the connector 50.

The connector 50 has a first rib 56A and a second rib 56B, which are formed to protrude respectively from both end parts in the width direction of the first body wall 511 to the outsides in the perpendicular direction and to extend in the attaching direction. The first rib 56A and the second rib 56B are formed to extend from the vicinities of the center parts in the attaching direction of the body part 51 over to the vicinities of the ends at the upstream side. As shown in FIG. 7A, when the connector cover 60 is attached to the connector 50, the first engagement part 62A is engaged with the first rib 56A, and the first engagement part 62B is engaged with the second rib 56B, whereby the first wall 62 restricts the movement of the connector cover 60 to the upstream side in the attaching direction.

Figure 9A:
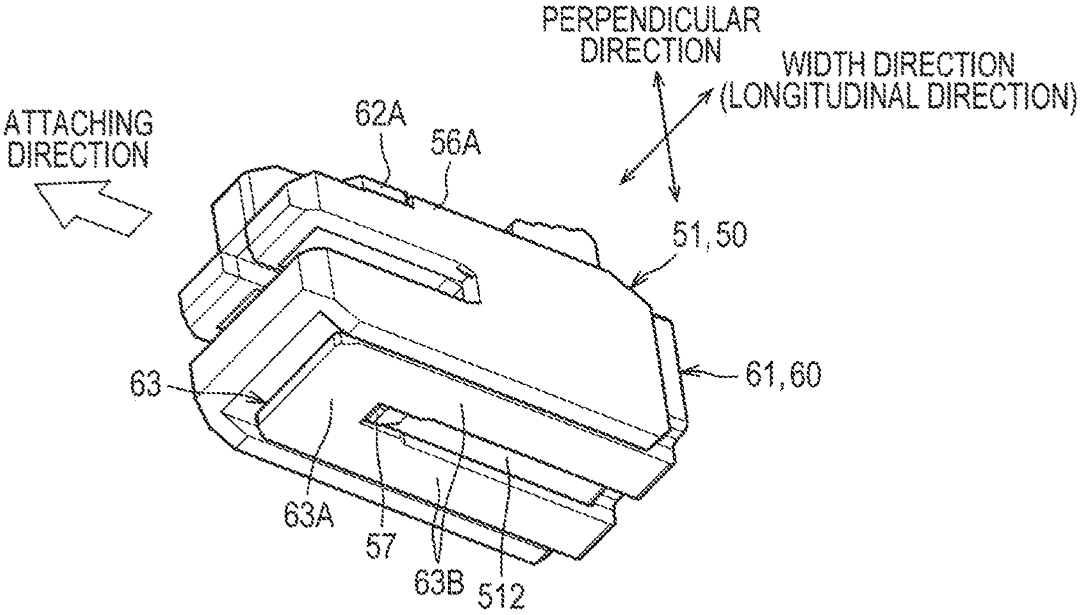
FIG. 9A is a perspective view showing the connector in a state where the connector cover is attached, as viewed from a second body wall side.
Figure 9B:
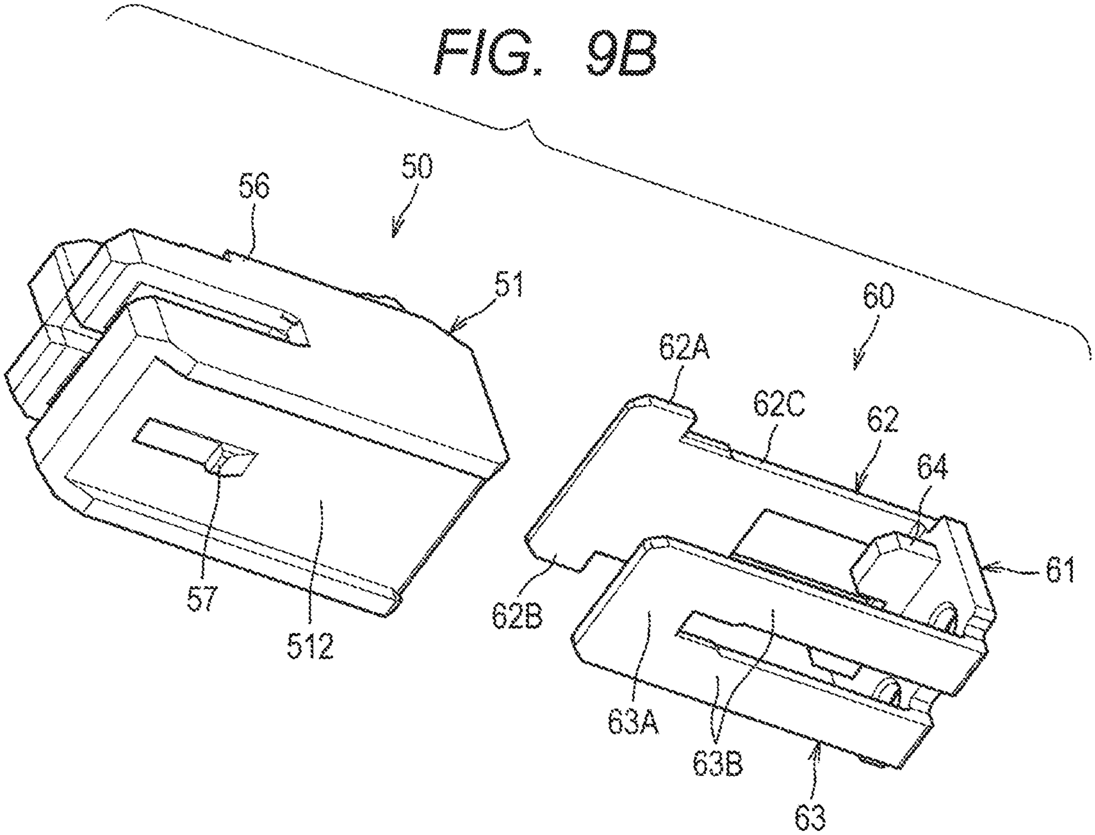
FIG. 9B is a perspective view showing the connector and the connector cover.

As shown in FIG. 9A and FIG. 9B, the second wall 63 has a second engagement part 63A. The second engagement part 63A when being engaged with the body part 51 of the connector 50 restricts the movement of the connector cover 60 to the upstream side in the attaching direction. Specifically, the second wall 63 has a pair of extension parts 63B formed to extend from the other end of the cover wall 61 in the perpendicular direction to the downstream side in the attaching direction. The pair of extension parts 63B are arranged at an interval in the width direction of the connector 50. The second engagement part 63A is arranged so as to connect the tip parts of the pair of extension parts 63B. The second wall 63 is formed substantially in a U-shape in which the bottom is located at the end at the downstream side in the attaching direction.

The connector 50 has a second claw 57 formed to protrude from the vicinity of the center part in the attaching direction of the second body wall 512, to the outside in the perpendicular direction. In the second claw 57, the surface at the downstream side in the attaching direction is substantially perpendicular to the attaching direction, and the surface at the upstream side in the attaching direction is inclined so as to separate from the second body wall 512 from the upstream side to the downstream side in the attaching direction. When the connector cover 60 is attached to the connector 50, the second engagement part 63A is engaged with the second claw 57, whereby the second wall 63 restricts the movement of the connector cover 60 to the upstream side in the attaching direction.

The connector cover 60 is made of resin with heat resistance, for example, PA66 (polyamide resin) or LCP (liquid crystal polymer). Such resin with heat resistance is relatively hard, and thus hard to be elastically deformed. In the present embodiment, in order to facilitate elastic deformation of the first wall 62 and the second wall 63 at the time when the connector cover 60 is attached to the connector 50, the first wall 62 and the second wall 63 in the present embodiment are formed in plate shapes sufficiently long in the attaching direction. As one example, the lengths in the attaching direction of the first wall 62 and the second wall 63 are more than 1.5 times longer than the distance in the perpendicular direction between the first wall 62 and the second wall 63.

As shown in FIG. 6B, the positioning part 64 is formed in a rib shape to protrude from the surface of the cover wall 61 at the downstream side in the attaching direction to the downstream side in the attaching direction, and to extend in the width direction of the connector 50. The positioning part 64 has, at the center in the width direction of the connector 50, a recess 64A which is recessed from the downstream side to the upstream side in the attaching direction. The recess 64A is configured to be engaged with the recess 515A (refer to FIG. 7B) formed on the fifth body wall 515 of the connector 50. When the connector cover 60 is attached to the connector 50, the recess 64A of the positioning part 64 is engaged with the recess 515A of the fifth body wall 515. This allows the position of the connector cover 60 to be restricted in the width direction of the connector 50 and in the perpendicular direction, with respect to the connector 50.

In order to attach the connector cover 60 to the connector 50, for example, ends of the cables 55 before being connected to the connection terminals 53 are inserted through the through holes 65 of the cover wall 61. The ends of the cables 55 (power cables) are then electrically connected to the connection terminals 53. Thereafter, the connector cover 60 is attached to the connector 50 such that the first wall 62 and the second wall 63 sandwich the body part 51, so as to make the first engagement parts 62A, 62B of the first wall 62 engaged with the ribs 56A, 56B of the body part 51 and to make the second engagement part 63A of the second wall 63 engaged with the second claw 57 of the body part 51. In this manner, the connector cover 60 is attached to the connector 50.

Figure 10:
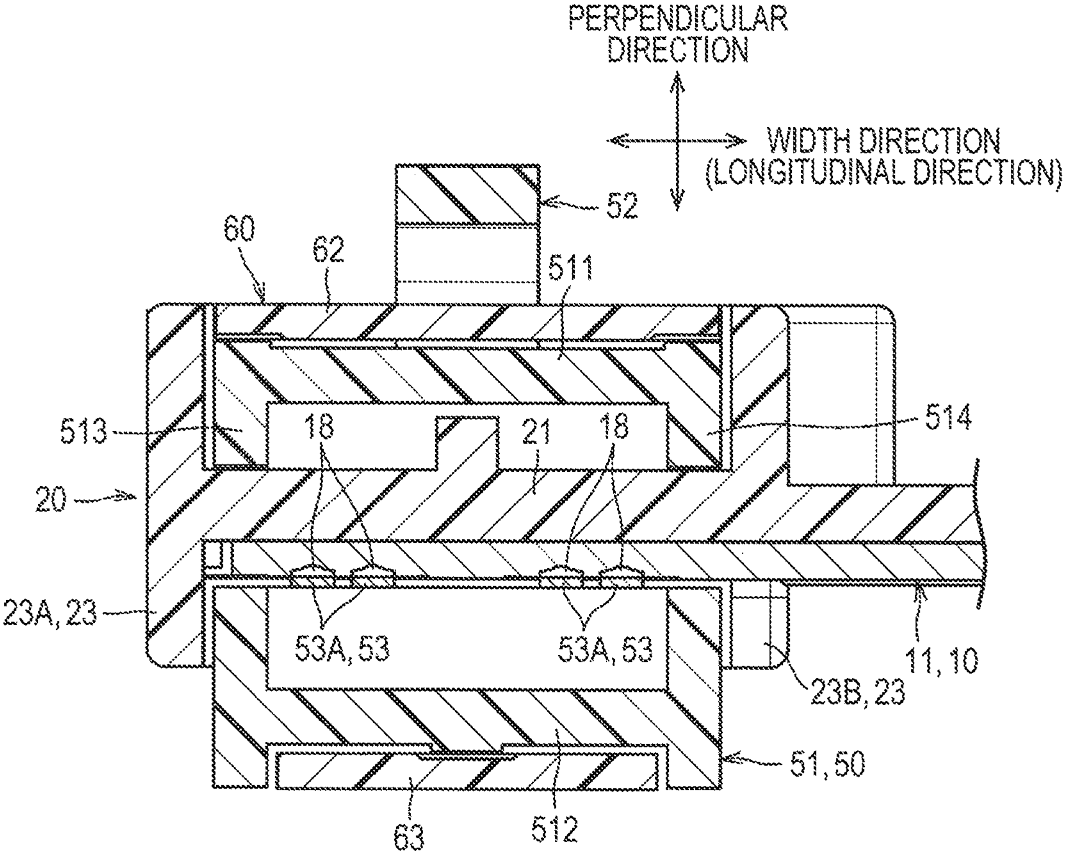
FIG. 10 is a cross-sectional view taken along a line X-X in FIG. 8.

As shown in FIG. 10, in a state where the connector 50 is attached to the holder 20, the pair of walls 23 of the holder 20 cover the contact parts 53A of the connection terminals 53, when viewed from the width direction of the connector 50. As shown in FIG. 8, the first body wall 511 and the second body wall 512 of the connector 50 cover the connection terminals 53 including the contact parts 53A, when viewed from the perpendicular direction. Moreover, in a state where the connector 50 is attached to the holder 20, the connection wall 24 of the holder 20 covers the downstream side of the connection terminals 53 in the attaching direction, and the cover wall 61 of the connector cover 60 covers the upstream side of the connection terminals 53 in the attaching direction.

The connection terminals 53 are arranged so as to be accommodated inside the enclosure formed by the body walls 511 to 514 of the connector 50, the pair of walls 23 and the connection wall 24 of the holder 20, and the cover wall 61 of the connector cover 60 in a state where the connector 50 to which the connector cover 60 is attached is attached to the holder 20. The body part 51 of the connector 50 and the holder 20 are made of resin with heat resistance, similarly to the connector cover 60.

In the second embodiment described above, the connection terminals 53 of the connector 50 are covered so as to be surrounded by the pair of walls 23 and the connection wall 24 of the holder 20, the first body wall 511 and the second body wall 512 of the body part 51 of the connector 50, and the cover wall 61 of the connector cover 60.

Since each of the through holes 65 of the cover wall 61 has the shape along the outer periphery of the cable 55, the gap between the cover wall 61 and the cable 55 is small. In the second embodiment, since the inner peripheral surface of the through hole 65 is in contact with the outer periphery of the cable 55, the gap between the cover wall 61 and the cable 55 is reduced.

The first wall 62 and the second wall 63 sandwich the body part 51 of the connector 50, and the first engagement parts 62A, 62B and the second engagement part 63A restrict the movement of the connector cover 60 to the upstream side in the attaching direction. This suppresses detachment of the connector cover 60 from the connector 50.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

In the embodiments described above, the restricting surfaces 28 of the holder 20 are arranged at both sides of the stopper 26 in the longitudinal direction of the heater 10. Alternatively, a restricting surface may be arranged at one side of a stopper, for example.

In the embodiments described above, the holder 20 has the pair of walls 23, the connection wall 24, and the bridging part 25. The configuration of a holder is not limited thereto. In an example, by referring to FIGS. 5A and 5B, a holder may further have a second bridging part which is configured to connect the ends at the lower sides in FIGS. 5A and 5B of the pair of walls 23, so that the connector 50 in a state of being attached to the holder is sandwiched between the second bridging part and the bridging part 25.

In the embodiments described above, the stopper 26 is connected to both of the pair of walls 23. Alternatively, a stopper may be connected to one of a pair of walls, for example. A holder may be configured without a connection wall, or may be configured without a pair of walls.

In the embodiments described above, the connector 50 has the claw 54 on the arm 52. Alternatively, a connector configured without an arm may have a claw formed to protrude directly from the body part thereof, for example. A plurality of claws may be arranged. A holder may be configured with one stopper with which a plurality of claws are engaged, or may be configured with a plurality of stoppers corresponding to a plurality of claws.

In the embodiments described above, the attaching direction of the connector 50 is perpendicular to the longitudinal direction of the heater 10. Alternatively, the attaching direction of a connector may be the same as the longitudinal direction of a heater, for example.

In the embodiments described above, the base board 11 of the heater 10 is formed of an elongated rectangular ceramic plate. Alternatively, the base board of a heater may be formed of an elongated rectangular metal plate such as stainless steel, for example.

In the embodiments described above, the power supply terminals 18 are located at the one end part of the heater 10 in the longitudinal direction. Alternatively, a positive power supply terminal may be located at one end part of a heater in the longitudinal direction, and a negative power supply terminal may be located at the other end part of the heater in the longitudinal direction, for example. In this case, a heating unit may include, as connectors, a first connector to be attached to one end part of a holder in the longitudinal direction, and a second connector to be attached to the other end part of the holder in the longitudinal direction.

In the embodiments described above, the power supply terminals 18 of the heater 10 and the connector 50 are located outside the belt 3 in the longitudinal direction of the heater 10. Alternatively, a power supply terminal of a heater and a connector may be located inside a belt in the longitudinal direction of the heater, for example.

In the embodiments described above, the heating unit 1 includes the heat conductive member 30. Alternatively, a heating unit may be configured without a heat conductive member, for example.

In the embodiments described above, the connector 50 has the body part 51 and the claw 54, and the holder 20 has the stopper 26 and the restricting surfaces 28. Alternatively, in a heating unit, a holder may be configured without a restricting surface, for example. In another example, in a heating unit, a connector may be configured with a body part, and a holder may be configured with a restricting surface, without a claw or a stopper.

The configuration of the first engagement parts 62A, 62B and the second engagement part 63A of the connector cover 60 in the embodiment described above is merely one example. In another example, a first engagement part may have the same configuration as the second engagement part 63A in the embodiment described above, and a second engagement part may have the same configuration as the first engagement parts 62A, 62B in the embodiment described above. In a body part, the portion to be engaged with a first engagement part and the portion to be engaged with a second engagement part may be changed as appropriate.

In the embodiment described above, the inner peripheral surfaces of the through holes 65 of the cover wall 61 of the connector cover 60 are in contact with the outer peripheries of the cables 55. Alternatively, there may be a slight gap between the inner peripheral surface of a through hole and the outer periphery of a cable, for example. With this configuration, the through hole easily allows the insertion of the cable. Even with such a configuration, the opening part allowing the insertion of the cable is formed to be smaller, compared with a case where a cover wall is formed with a recess (notch) opened at an edge thereof so that the cover wall allows the insertion of the cable. In the embodiment described above, the through holes 65 have circular shapes when viewed from the attaching direction. Alternatively, a through hole may have a rectangular shape, for example.

Each element described in the above-described embodiment and modifications may be arbitrarily combined and carried out.

What is claimed is:

1. A heating unit comprising:

a heater including:

a base board;

a resistance heating element provided on the base board; and a power supply terminal electrically connected to the resistance heating element;

an endless belt configured to rotate around the heater;

a holder holding the heater; and a connector including a connection terminal, the connection terminal being configured to be connected to the power supply terminal in a state where the connector is attached to the holder, the connector including:

a body part sandwiching a part of the holder and a part of the heater in a state where the connector is attached to the holder; and a claw protruding in a direction away from the body part, the holder including:

an engagement part configured to engage with the claw from an upstream side in an attaching direction, the attaching direction being a direction in which the connector is attached to the holder and a guide part having a guide surface formed along an inner peripheral surface of the endless belt.

2. The heating unit according to claim 1, wherein the connector includes an arm extending in the attaching direction, the arm including one end and an other end, the one end being connected to the body part, the arm being configured to elastically bend such that the other end moves closer to the body part;

wherein the body part is in contact with an opposite surface of the part of the holder in a state where the connector is attached to the holder, the opposite surface being a surface opposite to the heater;

wherein the claw is formed at the arm;

wherein, in a state where the connector is attached to the holder, the engagement part is arranged at a position sandwiching the arm together with the body part; and wherein the arm is configured to contact the engagement part in a state where the connector is attached to the holder.

3. A heating unit comprising:

a heater including:

a base board;

a resistance heating element provided on the base board; and a power supply terminal electrically connected to the resistance heating element, an endless belt configured to rotate around the heater;

a holder holding the heater; and a connector including a connection terminal, the connection terminal being configured to be connected to the power supply terminal in a state where the connector is attached to the holder, the connector including:

a body part sandwiching a part of the holder and a part of the heater in a state where the connector is attached to the holder, and a claw protruding in a direction away from the body part, the holder including:

an engagement part configured to engage with the claw from an upstream side in an attaching direction, the attaching direction being a direction in which the connector is attached to the holder wherein the holder includes a pair of walls facing each other in a direction perpendicular to the attaching direction, the pair of walls sandwiching the connector therebetween in a state where the connector is attached to the holder; and wherein one end of the engagement part is connected to one of the pair of walls, and an other end of the engagement part is connected to an other one of the pair of walls.

4. The heating unit according to claim 3, wherein the holder includes a connection wall connecting both downstream ends of the pair of walls in the attaching direction.

5. The heating unit according to claim 1, wherein the holder includes a restricting surface located upstream of the power supply terminal in the attaching direction, the restricting surface facing the body part in a perpendicular direction perpendicular to both the attaching direction and a width direction of the connector, the restricting surface being configured to contact the body part.

6. The heating unit according to claim 5, wherein the restricting surface is arranged at both sides of the engagement part in the width direction.

7. The heating unit according to claim 4, wherein the body part includes a first body wall and a second body wall facing in a perpendicular direction perpendicular to both the attaching direction and the direction in which the pair of walls face each other, the first body wall and the second body wall covering the connection terminal; and wherein the heating unit further comprises a connector cover configured to be attached to the connector, the connector cover including a cover wall covering an upstream side of the connection terminal in the attaching direction.

8. The heating unit according to claim 7, wherein the cover wall has a hole through which a cable to be connected to the connection terminal passes; and wherein the hole has a shape along an outer circumference of the cable.

9. The heating unit according to claim 7, wherein the connector cover includes:

a first wall extending in the attaching direction from one end of the cover wall in the perpendicular direction; and a second wall extending in the attaching direction from an other end of the cover wall in the perpendicular direction, the first wall and the second wall sandwiching the body part therebetween;

wherein the first wall includes a first wall engagement part configured to engage with the body part from a downstream side in the attaching direction; and wherein the second wall includes a second wall engagement part configured to engage with the body part from the downstream side in the attaching direction.

10. The heating unit according to claim 1, wherein the heater extends in a longitudinal direction;

wherein the holder extends in the longitudinal direction; and wherein the connector is attached to the holder at a position outside the endless belt in the longitudinal direction.

11. A hearing unit comprising:

a heater including;

a base board;

a resistance heating element provided on the base board; and a power supply terminal electrically connected to the resistance heating element, an endless belt configured to rotate around the heater;

a holder holding the heater; and a connector including a connection terminal, the connection terminal being configured to be connected to the power supply terminal in a state where the connector is attached to the holder, the connector including:

a body part sandwiching a part of the holder and a part of the heater in a state where the connector is attached to the holder, and a claw protruding in a direction away from the body part, the holder including:

an engagement part configured to engage with the claw from an upstream side in an attaching direction, the attaching direction being a direction in which the connector is attached to the holder, wherein the body part includes a base part, a first extension part, and a second extension part;

wherein the first extension part extends from the base part in the attaching direction;

wherein the second extension part extends from the base part in the attaching direction;

wherein the first extension part includes the connection terminal;

wherein the first extension part and the second extension part are arranged at an interval in a perpendicular direction which is perpendicular to both the attaching direction and a width direction of the connector; and wherein the first extension part and the second extension part sandwich the part of the holder and the part of the heater in the perpendicular direction.

12. The heating unit according to claim 11, wherein the connector includes an arm including one end and an other end;

wherein the one end is connected to a downstream end of the second extension part in the attaching direction;

wherein the arm extends from the one end to the other end in a direction from a downstream side toward an upstream side in the attaching direction; and wherein the arm is configured, when the connector is attached to the holder, to elastically bend such that the other end moves closer to the second extension part in a state where the arm is in contact with the engagement part.

13. A heating unit comprising:

a heater including:

a base board;

a resistance heating element provided on the base board; and a power supply terminal electrically connected to the resistance heating element;

an endless belt configured to rotate around the heater;

a holder holding the heater; and a connector including a connection terminal, the connector being configured to be attached to the holder by sandwiching a part of the holder and a part of the heater, the connection terminal being configured to be connected to the power supply terminal in a state where the connector is attached to the holder, the connector including:

a body part sandwiching the part of the holder and the part of the heater in a state where the connector is attached to the holder, the holder including a restricting surface located upstream of the power supply terminal in an attaching direction in which the connector is attached to the holder, the restricting surface facing the body part in a perpendicular direction perpendicular to both the attaching direction and a width direction of the connector, the restricting surface being configured to contact the body part.

14. The heating unit according to claim 13, wherein the connector includes an arm extending in the attaching direction, the arm including one end and an other end, the one end being connected to the body part, the arm being configured to elastically bend such that the other end moves closer to the body part;

wherein the body part is in contact with an opposite surface of the part of the holder in a state where the connector is attached to the holder, the opposite surface being a surface opposite to the heater;

wherein a claw is formed at the arm;

wherein, in a state where the connector is attached to the holder, an engagement part is arranged at a position sandwiching the arm together with the body part; and wherein the arm is configured to contact the engagement part in a state where the connector is attached to the holder.

15. The heating unit according to claim 13, wherein the holder includes a pair of walls facing each other in the width direction, the pair of walls sandwiching the connector therebetween in a state where the connector is attached to the holder; and wherein one end of the engagement part is connected to one of the pair of walls, and an other end of the engagement part is connected to an other one of the pair of walls.

16. The heating unit according to claim 15, wherein the holder includes a connection wall connecting both downstream ends of the pair of walls in the attaching direction.

17. The heating unit according to claim 13, wherein the restricting surface is arranged at both sides of the engagement part in the width direction.

18. The heating unit according to claim 16, wherein the body part includes a first body wall and a second body wall facing in the perpendicular direction, the first body wall and the second body wall covering the connection terminal; and wherein the heating unit further comprises a connector cover configured to be attached to the connector, the connector cover including a cover wall covering an upstream side of the connection terminal in the attaching direction.

19. The heating unit according to claim 18, wherein the cover wall has a hole through which a cable to be connected to the connection terminal passes; and wherein the hole has a shape along an outer circumference of the cable.

20. The heating unit according to claim 18, wherein the connector cover includes:

a first wall extending in the attaching direction from one end of the cover wall in the perpendicular direction; and a second wall extending in the attaching direction from an other end of the cover wall in the perpendicular direction, the first wall and the second wall sandwiching the body part therebetween;

wherein the first wall includes a first wall engagement part configured to engage with the body part from a downstream side in the attaching direction; and wherein the second wall includes a second wall engagement part configured to engage with the body part from the downstream side in the attaching direction.

* * * * *